United States Patent
Gendotti et al.

(10) Patent No.: US 9,651,689 B2
(45) Date of Patent: May 16, 2017

(54) DETECTOR ARRANGEMENT FOR THE DETECTION OF IONIZING RADIATION AND METHOD FOR OPERATING SUCH A DETECTOR ARRANGEMENT

(71) Applicant: Arktis Radiation Detectors Ltd., Zurich (CH)

(72) Inventors: Ulisse Gendotti, Zurich (CH); Rico Chandrasekharan, Zurich (CH); Leonard Goeltl, Baden (CH); Giovanna Davatz, Zurich (CH)

(73) Assignee: Arktis Radiation Detectors Ltd, Zurich (CH)

( * ) Notice: Subject to any disclaimer, the term of this patent is extended or adjusted under 35 U.S.C. 154(b) by 55 days.

(21) Appl. No.: 13/925,018

(22) Filed: Jun. 24, 2013

(65) Prior Publication Data

US 2014/0374606 A1 Dec. 25, 2014

(51) Int. Cl.
*G01T 3/06* (2006.01)

(52) U.S. Cl.
CPC ...................................... *G01T 3/06* (2013.01)

(58) Field of Classification Search
CPC ....................................................... G01T 3/06
See application file for complete search history.

(56) References Cited

U.S. PATENT DOCUMENTS

| | | | |
|---|---|---|---|
| 2,721,943 A | 10/1955 | Armistead | |
| 3,381,131 A * | 4/1968 | Meal et al. | 376/155 |
| 5,774,515 A * | 6/1998 | Fujiwara et al. | 376/254 |
| 8,519,350 B2 | 8/2013 | McGregor et al. | |
| 9,360,563 B2 * | 6/2016 | Perna | G01T 1/20 |
| 2005/0258373 A1 | 11/2005 | Lacy | |
| 2008/0210880 A1* | 9/2008 | Baroni et al. | 250/390.11 |
| 2009/0080596 A1* | 3/2009 | Sowerby et al. | 378/5 |
| 2011/0017916 A1* | 1/2011 | Schulz | G01T 1/2002 250/368 |
| 2011/0089332 A1* | 4/2011 | Ivan et al. | 250/390.11 |
| 2011/0291014 A1* | 12/2011 | Kusner | 250/362 |

(Continued)

FOREIGN PATENT DOCUMENTS

| CA | 2312593 A1 | 2/2001 | |
| GB | WO 2013121191 A1 * | 8/2013 | G01T 1/20 |

(Continued)

OTHER PUBLICATIONS

Resnati, F., Gendotti, U., Chandra, R., Curioni, A., Davatz, G., Friederich, H., Gendotti, A., Goeltl, L. , Jebali, R., Murer, D., and Rubbia, A.; "Suitability of high-pressure xenon as scintillator for gamma ray spectroscopy"; Nuclear Instruments and Methods in Physics Research Section A: Accelerators, Spectrometers, Detectors and Associated Equipment, vol. 715, 22 (Mar. 22, 2013).

*Primary Examiner* — Christine Sung
(74) *Attorney, Agent, or Firm* — The Webb Law Firm (57) ABSTRACT

A detector arrangement (10) for the detection of ionizing radiation comprises at least one light sensing device (14) and a multifunctional coating (12) arranged in an interacting relation to said at least one light sensing device (14), whereby said multifunctional coating (12) is configured to perform the functions of reflecting light of a given wavelength; and converting at least part of thermal and/or epithermal neutrons entering said multifunctional coating (12) into light (15).

23 Claims, 9 Drawing Sheets

(56) References Cited

U.S. PATENT DOCUMENTS

| | | |
|---|---|---|
| 2012/0161011 A1* | 6/2012 | Menge ................... G01T 3/06 250/361 R |
| 2013/0001424 A1 | 1/2013 | Kusner |
| 2013/0034198 A1* | 2/2013 | Chandrasekharan et al. ........................ 376/159 |
| 2013/0146775 A1* | 6/2013 | Ramsden et al. ............ 250/362 |
| 2013/0228696 A1 | 9/2013 | McGregor et al. |
| 2014/0091227 A1* | 4/2014 | Yang et al. .................. 250/367 |
| 2014/0306117 A1* | 10/2014 | Vacheret .................. G01T 3/06 250/366 |

FOREIGN PATENT DOCUMENTS

| | | |
|---|---|---|
| WO | 2007121876 A2 | 11/2007 |
| WO | 2011025853 A1 | 3/2011 |
| WO | 2011032569 A1 | 3/2011 |
| WO | 2012007734 A2 | 1/2012 |

* cited by examiner

DETECTOR ARRANGEMENT FOR THE DETECTION OF IONIZING RADIATION AND METHOD FOR OPERATING SUCH A DETECTOR ARRANGEMENT

BACKGROUND OF THE INVENTION

The present invention relates to the technology of detecting ionizing radiation. It refers to a detector arrangement for the detection of ionizing radiation.

It further relates to a method for operating such a detector arrangement.

PRIOR ART

Document WO 2012/007734 A2 describes a radiation detector for neutrons and gamma rays with a conversion layer comprising a neutron capturing material and a phosphor, such that neutrons are converted into light signals. These light signals are then allowed to enter into a light guide, the light guide contains a wavelength shifter that absorbs the light and reemits at a longer wavelength. Reemission is isotropic, such that a fraction of the reemitted light can be transported via total internal reflection inside the light guide, until detected via a photoelectric converter, e.g. photomultiplier or similar device. In one embodiment, the light guide may be a scintillator.

Document CA 2 312 593 A1 describes a scintillator surrounded by a neutron conversion layer within a gamma radiation shield. The scintillator detects gamma rays of characteristic energy emitted by said conversion layer upon neutron capture.

Other prior art such as document US 2005/0258373 A1 also use conversion layers to detect thermal neutrons in proportional counters The US 2005/0258373 thereby exploits a charge collection approach.

Document WO 2007/121876 A2 describes a radiation detector based on noble gas scintillation, where pulse shape discrimination is used to distinguish different particle interactions, such as for example fast neutrons from gamma rays.

However, known radiation detector arrangements are not very flexible in their operation, and mostly have a complicated configuration.

SUMMARY OF THE INVENTION

It is an object of the invention, to improve the area of application of such detector arrangements.

It is another object of the invention to provide detector arrangements, which are more compact and/or more versatile.

It is another object of the invention to disclose a method for operating such a detector arrangement.

These and other objects are achieved by a detector arrangement for the detection of ionizing radiation comprising at least one light sensing device and a multifunctional coating arranged in an interacting relation to said at least one light sensing device, whereby said multifunctional coating is configured to perform the functions of a) reflecting light of a given wavelength; and
b) converting at least part of thermal and/or epi-thermal neutrons entering said multifunctional coating into light.

According to an embodiment of the invention said multifunctional coating is capable of emitting particles such as neutron conversion products in accompaniment of the emitted light.

Preferably, a geometry is chosen to maximize the area of the multifunctional coating per volume of the detector arrangement or per sensitive area of the light sensitive device.

According to another embodiment of the invention said multifunctional coating is capable of shifting short wavelength light impinging upon it, reemitting light with a wavelength to which it is reflective.

According to another embodiment of the invention said multifunctional coating comprises a first layer of a neutron conversion material and a second layer of a wavelength shifting material.

Specifically, said first layer contains Li-6 or B-10, and said second layer contains Tetra Phenyl Butadiene (TPB).

More specifically, the thickness of said first layer is between 1 μm and 40 μm and said second layer has a thickness between 0.1 μm and 1 μm.

According to another embodiment of the invention said first and second layers are applied to a flexible substrate, especially of Tyvek®, or a PTFE membrane.

According to another embodiment of the invention, the volume between the multifunctional coating and the light sensing device includes a vacuum.

According to a further embodiment of the invention a scintillator volume is provided, which is in optical contact with said multifunctional coating, such that said multifunctional coating reflects light of a given wavelength coming from the scintillator volume, back through said scintillator volume, and said light from neutron conversion in said multifunctional coating is emitted into the scintillator volume, whereby the light is detected by said light sensing device.

Specifically, said light sensing device is one of a photomultiplier or pixelated Geiger mode avalanche photodiode.

According to another embodiment of the invention a scintillator volume is provided, which is in optical contact with said multifunctional coating, such that said multifunctional coating reflects light of a given wavelength coming from the scintillator volume, back through said scintillator volume, shifts light of shorter wavelengths to be re-emitted back through said scintillator volume at a wavelength at which said multifunctional coating is reflective; and emits light from neutron conversion into the said scintillator volume, whereby the light is detected by said light sensing device.

Specifically, said light sensing device is one of a photomultiplier or pixelated Geiger mode avalanche photodiode.

According to another embodiment of the invention a scintillator volume is provided, which is in optical contact with said multifunctional coating, such that said multifunctional coating reflects light of a given wavelength coming from the scintillator volume, back through said scintillator volume, shifts light of shorter wavelengths to be re-emitted back through said scintillator volume at a wavelength at which said multifunctional coating is reflective; and emits light as well as one or more particles with mass such as conversion products into the said scintillator volume, the particle causing scintillation inside the scintillator volume, when falling back upon the multifunctional coating said scintillation light can be shifted and re-emitted back through said scintillator volume, and the light from the multifunctional coating and the scintillator volume is detected by said light sensing device, directly or after having been shifted in wavelength.

Specifically, said light sensing device is one of a photomultiplier or pixelated Geiger mode avalanche photodiode.

According to another embodiment of the invention said scintillator volume consists primarily of noble gas such as helium, argon or xenon or a mixture of noble gas, such as helium doped with xenon. Due to the fact that these gases scintillate in the vacuum ultraviolet (VUV) region at wavelengths that are difficult to collect and detect, the multifunctional coating's wavelength shifting property is useful: It can shift scintillation light from VUV to visible, which can be reflected including by the multifunctional coating, and detected by light sensing devices such as photomultiplier tubes.

Specifically, said scintillator volume is predominantly helium, thereby allowing the simultaneous measurement and distinction of fast neutrons, thermal neutrons, and/or photons and electrons produced by the interaction of photons with a detector wall.

Alternatively, said scintillator volume is predominantly xenon, thereby allowing gamma spectrometry to be performed while also measuring neutrons.

According to another embodiment of the invention said scintillator volume is predominantly PVT or a liquid scintillator, thereby allowing the simultaneous measurement of gammas and neutrons.

According to another embodiment of the invention solid state light sensors such as pixelated Geiger mode avalanche photodiodes are immersed in the scintillating gas.

According to another embodiment of the invention an in-situ gas purification device such as a getter is immersed in the gas of said scintillator volume, thereby assuring a stable gas composition.

According to another embodiment of the invention a plurality of light sensing devices is interspersed in the area of said multifunctional coating.

In the inventive method for operating a detector arrangement according to the invention the signals from said neutron conversion are discerned from signals from said scintillator volume by pulse shape discrimination, whereby the signals involving light emitted by said multifunctional coating typically have a different time structure than the signals from said scintillator volume.

According to an embodiment of the inventive method, the light signals from said neutron conversion combined with the light signals from particle emission from the multifunctional coating into said scintillator volume are discerned from signals from said scintillator volume alone by pulse shape discrimination, whereby the signals from neutron conversion typically have a different time structure than the signals from said scintillator volume.

BRIEF DESCRIPTION OF THE DRAWINGS

The present invention is now to be explained more closely by means of different embodiments and with reference to the attached drawings.

FIG. 4bis shows the difference in time structure of actual measured signals detected by the detector arrangement according to the invention;

DETAILED DESCRIPTION OF DIFFERENT EMBODIMENTS OF THE INVENTION

Figure 1:
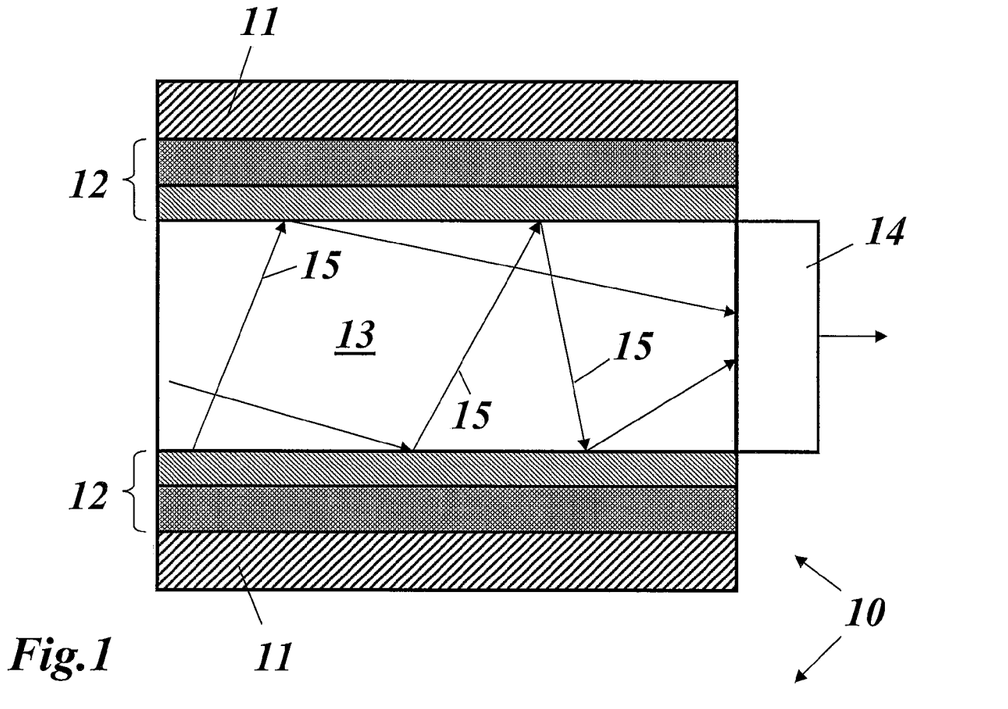
FIG. 1 shows in a longitudinal cross section a detector arrangement comprising a multifunctional coating with diffuse reflective properties according to an embodiment of the invention.

FIG. 1 shows in a longitudinal cross section a detector arrangement comprising a multifunctional coating with diffuse reflective properties according to an embodiment of the invention. In FIG. 1 the multifunctional coating 12 of the detector arrangement 10 is in contact with a scintillator volume 13, such as noble gas. Said multifunctional coating 12 has reflective properties, such that light or light signals 15 can be transported by means of diffuse reflection until impinging on the sensitive area of a light sensing device 14, such as a photomultiplier tube or a solid state light detector. The multifunctional coating 12 can be coated directly onto the wall 11 of the detector arrangement 10 or onto a substrate such as PTFE or Tyvek®, which is then inserted into the detector arrangement 10.

Figure 2:
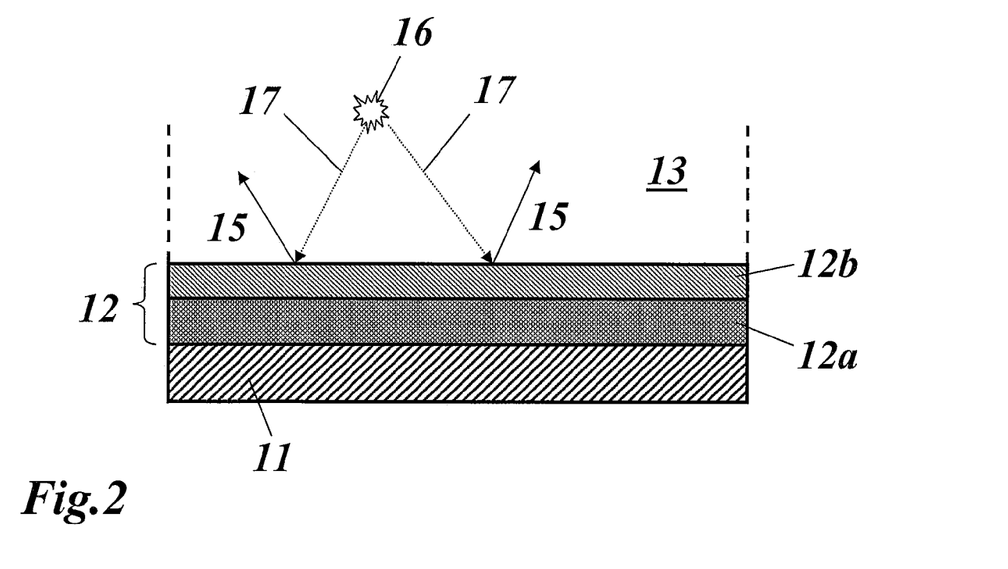
FIG. 2 shows, similar to FIG. 1, part of a detector arrangement comprising a multifunctional coating with wavelength shifting properties according to another embodiment of the invention.

In an embodiment of the invention according to FIG. 2 the multifunctional coating 12 contains a first layer 12a containing a neutron conversion material such as Li-6. This conversion layer 12 is overcoated with a second layer 12b of fast wavelength shifting material such as Tetraphenyl Butadiene (TPB). This wavelength shifting coating 12b can convert short wavelength noble gas scintillation light 17 into longer wavelength visible light 15 that is better suited for detection with a photomultiplier tube or solid state light detection devices.

Figure 3A:
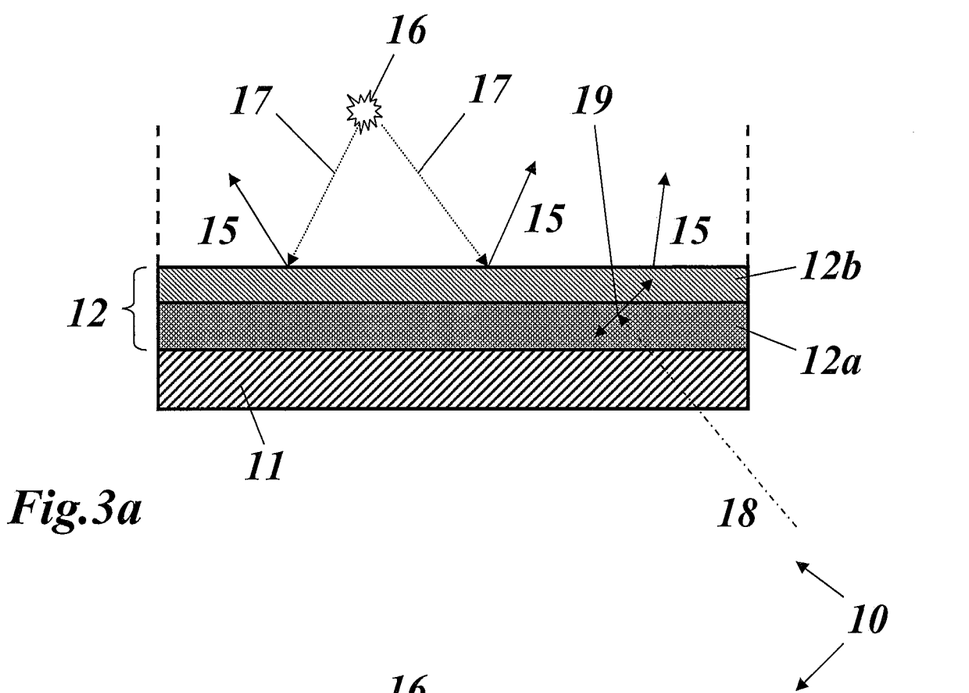
FIG. 3a shows, similar to FIG. 2, part of a detector arrangement comprising a multifunctional coating converting thermal neutrons to light signals according to another embodiment of the invention.

As shown in FIG. 3a, the conversion layer 12a may contain $^6$LiF. In one embodiment of the invention, the conversion layer is made of $^6$LiF in an epoxy matrix. $^6$Li has a high probability of capturing thermal neutrons, leading to the decay into $^4$He+$^3$T. These two conversion products 19 will share a kinetic energy of almost 5 MeV. The thickness of the conversion layer 12a is chosen to be thin enough, such as to allow a high probability for conversion products 19 to exit the conversion layer 12a and enter into the overlying wavelength shifter layer 12b, causing this to emit visible light 15 into the scintillation volume. The light produced in the fast wavelength shifter 12b has a time structure that is shorter and faster than scintillation signals from the scintillator volume 13, allowing the distinction between a neutron conversion event in the multifunctional coating 12 and radiation interactions in scintillator volume 13.

Figure 3B:
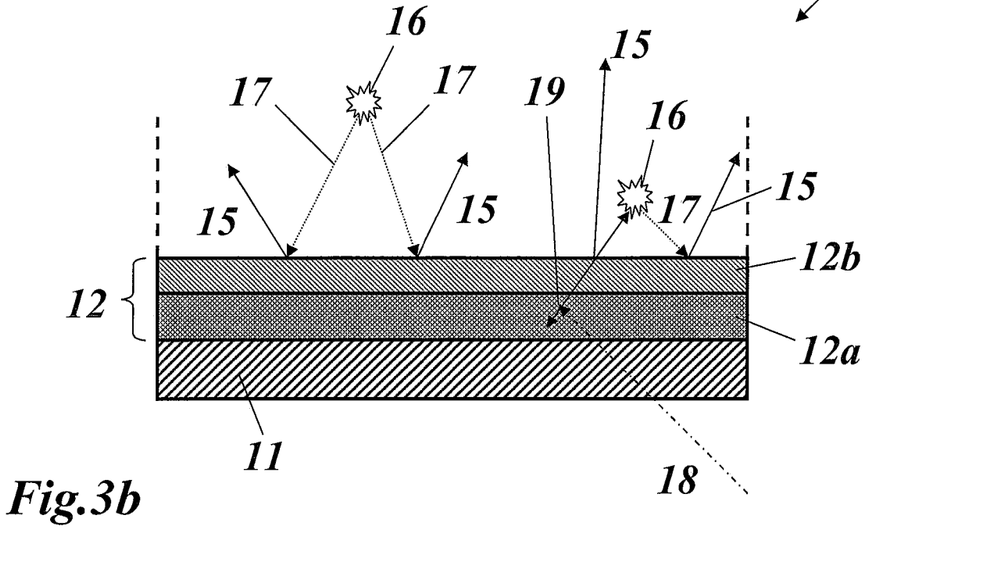
FIG. 3b shows, similar to FIG. 3a, part of a detector arrangement comprising a multifunctional coating converting thermal neutrons to light signals and emitting one or more particles according to another embodiment of the invention.

As shown in FIG. 3b, the conversion layer 12a may contain $^6$LiF. In one embodiment of the invention, the conversion layer is made of $^6$LiF in an epoxy matrix. $^6$Li has a high probability of capturing thermal neutrons, leading to the decay into $^4$He+$^3$T. These two conversion products 19 will share a kinetic energy of almost 5 MeV. The thickness of the conversion layer 12a is chosen to be thin enough, such as to allow a high probability for conversion products 19 to exit the conversion layer 12a and enter into the overlying wavelength shifter layer 12b, causing this to emit visible light 15 into the scintillation volume. Furthermore according to FIG. 3b the shifter layer 12b is chosen to be thin enough, such as to allow a high probability for a conversion product 19 to exit into the scintillator volume 13. The scintillation light produced by the conversion product in the scintillator, upon falling upon the multifunctional coating, can be shifted by the coating to the visible range. The light produced in the fast wavelength shifter 12b has a time structure that is shorter and faster than scintillation signals from the scintillator volume 13, allowing the distinction between a neutron conversion event in the multifunctional coating 12 combined with the scintillator 13 and radiation interactions in scintillator volume 13 alone.

In embodiments of the invention where the scintillator volume 13 is liquid or gaseous, the multifunctional coating 12 can be coated directly onto the inside of the wall 11.

In embodiments of the invention where the volume between the multifunctional coating 12 and the light sensing device 14 is a vacuum, the multifunctional coating 12 can be coated directly onto the inside of the wall 11.

In another embodiment of the invention, the multifunctional coating is coated onto a substrate such as Tyvek® or a membrane, foil, or structured material of PTFE. Said substrate can be an efficient diffuse reflector. If the scintillator volume 13 is a fluid, said substrate can be inserted along the inner wall of a detector. If the scintillator volume 13 is a solid, said substrate can be used to wrap the scintillator. Alternatively, the multifunctional coating 12 may be coated directly onto the solid scintillator. If the volume between the multifunctional coating 12 and the light sensing device 14 contains a vacuum, the multifunctional coating 12 can be coated on a substrate that can be inserted along the inner wall of a detector.

Figure 4:
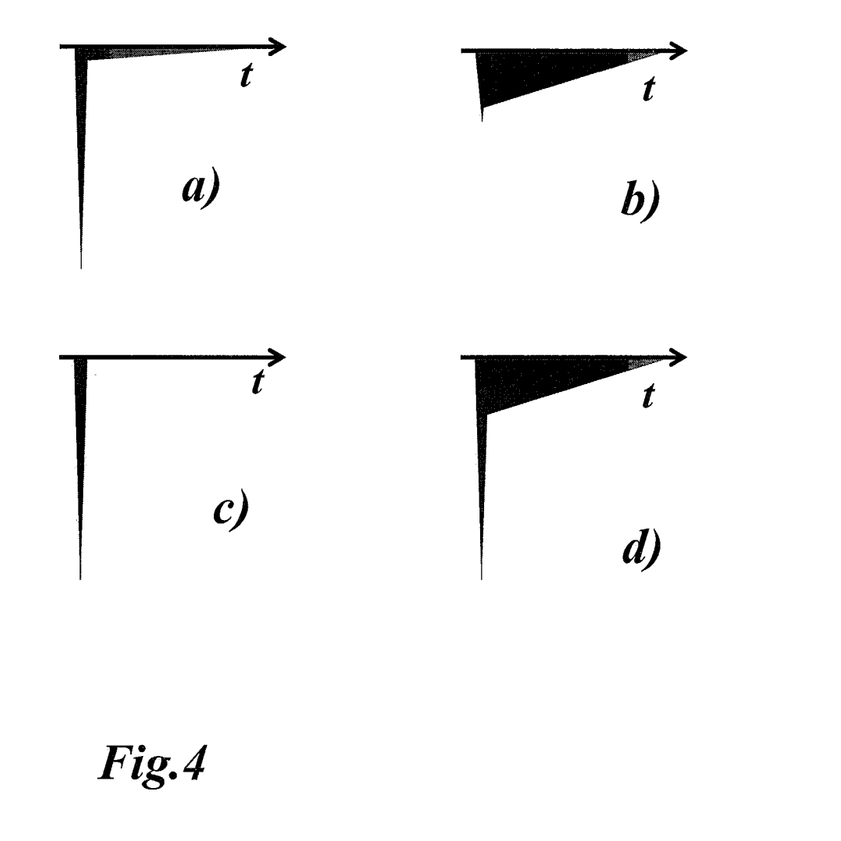
FIG. 4 shows the notional difference in signal shape for gamma rays interacting in the scintillator (FIG. 4a), a fast neutron or heavy particle interacting in the scintillator (FIG. 4b), a charged particle interacting with the multifunctional coating (FIG. 4c) and a massive particle such as a neutron conversion product producing light in the multifunctional coating, then producing light in the scintillator (FIG. 4d) detected by the detector arrangement according to the invention.

In an embodiment of the invention according to FIG. 4, where the scintillator volume 13 is noble gas, gamma ray and fast neutron interaction can be distinguished by their pulse shape according to WO 2007/121876 A2. The signal of thermal conversion in the multifunctional coating 12 gives a signal with yet another pulse shape, such that the interactions can be distinguished. FIG. 4 notionally depicts the difference in pulse shape between these interactions, whereby a signal shape according to FIG. 4a relates to interactions of gamma radiation in the scintillator volume 13, FIG. 4b relates to fast neutrons or heavy particles interacting in the scintillator volume 13, FIG. 4c to charged particles interacting in the multifunctional coating, and FIG. 4d to the combination of the processes described in connection with FIGS. 4b and 4c.

FIG. 4b is shows actual signals measured by an embodiment of the invention. The upper two signals are caused by fast neutron interactions, the lower left by a gamma interaction, and the lower right by a thermal neutron interaction. The time structure difference between event types can be seen. A variety of possible methods to discern between interaction types becomes evident, for example by comparing integrals over short times, over the full signal, pulse height few nanoseconds after signal start, and maximum pulse height.

Figure 5:
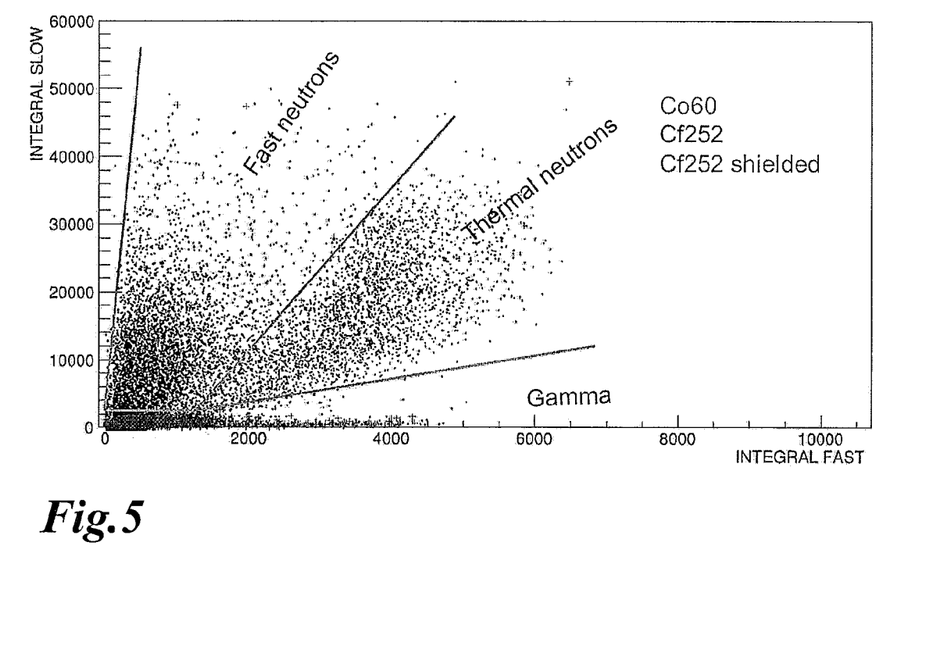
FIG. 5 shows in a diagram how signal analysis enables the distinction between different radiation types.

FIG. 5 shows actual measurement data taken with a detector according to the invention, whereby the scintillator volume 13 is predominantly helium. Fast neutrons, thermal neutrons and gamma rays can clearly be distinguished on the basis of their pulse shape (see FIG. 4): The signals are integrated from signal start over a short time period (x axis) and a longer time period (y-axis). For neutron detection, gamma rejection is often a key attribute. Measurements with this detector demonstrated the capability to detect neutrons while rejecting gamma radiation fields up to 400 μSv/hr.

Figure 6A:
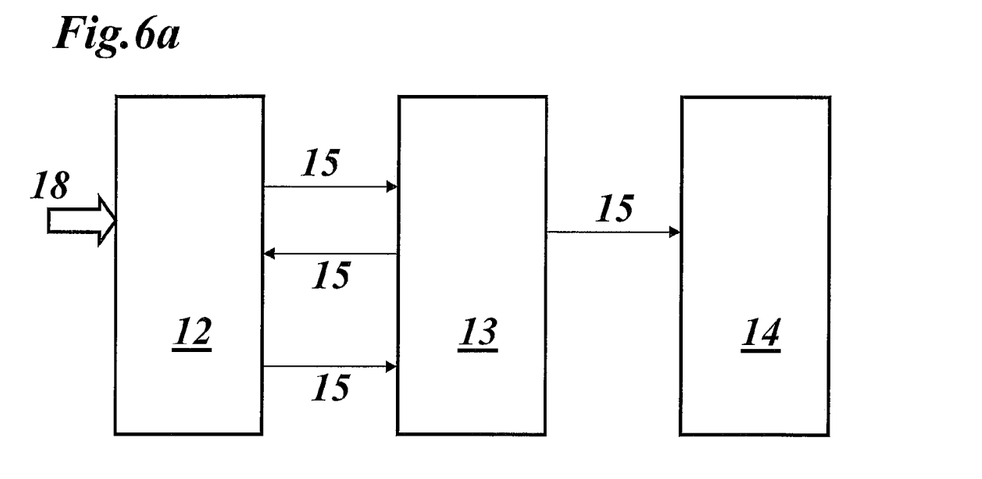
FIG. 6a shows in a schematic diagram the multifunctional coating capable of converting neutrons to light, and reflecting visible light.

According to FIG. 6a the multifunctional coating 12 converts thermal neutrons 18 to light signals 15 and transmits these to the scintillator volume 13. Furthermore, the multifunctional coating 12 is reflective, allowing light signals 15 to be reflected until they can be detected by a light sensing device 14 such as a photo multiplier.

Figure 6B:
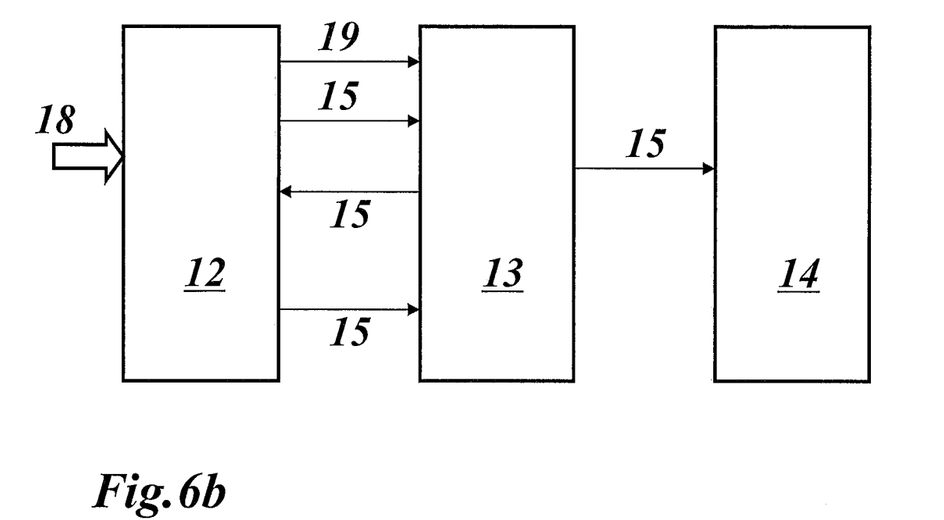
FIG. 6b shows in a schematic diagram the multifunctional coating capable of converting neutrons to light as well as particles, and reflecting visible light.

According to FIG. 6b the multifunctional coating 12 converts thermal neutrons 18 to light signals 15 and transmits these to the scintillator volume 13. Also, conversion products 19 are emitted into the scintillator volume, causing scintillation. Furthermore, the multifunctional coating 12 is reflective, allowing light signals 15 to be reflected until they can be detected by a light sensing device 14 such as a photo multiplier.

Figure 7A:
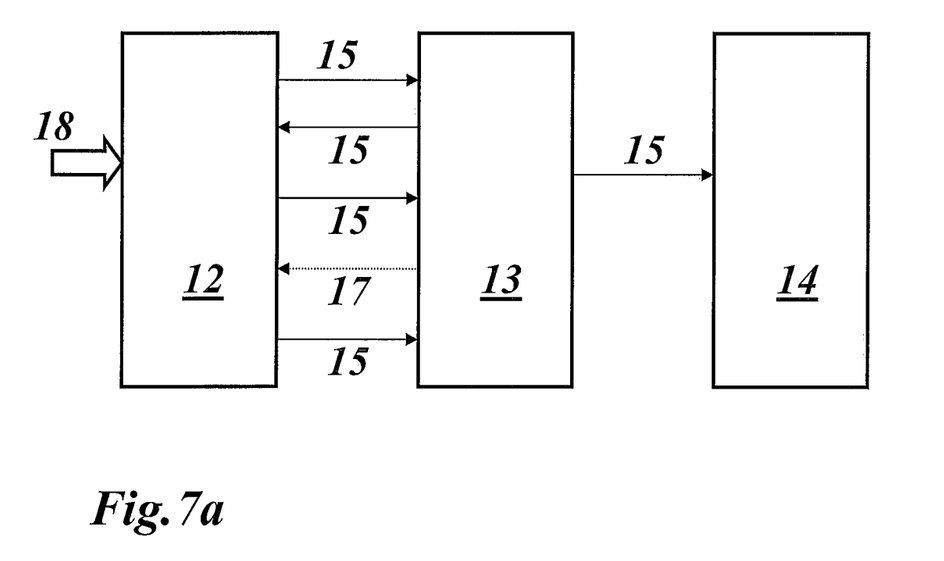
FIG. 7a shows in a schematic diagram similar to FIG. 6a the multifunctional coating capable of converting neutrons to light, reflecting visible light, and shifting short wavelength light to visible light.

According to FIG. 7a the multifunctional coating 12 converts thermal neutrons 18 to light signals 15 and transmits these to the scintillator volume 13. Furthermore, the multifunctional coating 12 is reflective, allowing light signals 15 to be reflected until they can be detected by a light sensing device 14 such as a photo multiplier. In addition, the multifunctional coating 12 is capable of shifting shorter wavelength scintillation light 17 coming from the scintillator volume 13, re-emitting visible light 15 back into the volume of scintillator.

Figure 7B:
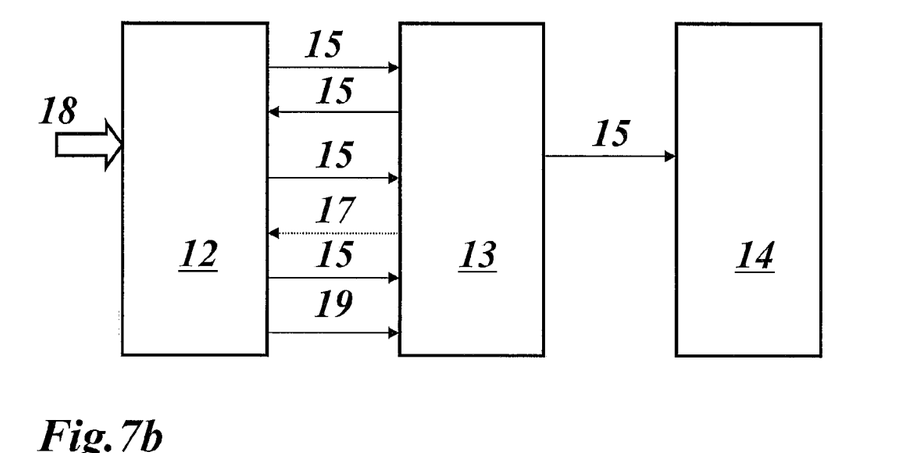
FIG. 7b shows in a schematic diagram similar to FIG. 6b the multifunctional coating capable of converting neutrons to light as well as particles, reflecting visible light, and shifting short wavelength light to visible light.

According to FIG. 7b the multifunctional coating 12 converts thermal neutrons 18 to light signals 15 and transmits these to the scintillator volume 13. Also, conversion products 19 are emitted into the scintillator volume, causing scintillation. Furthermore, the multifunctional coating 12 is reflective, allowing light signals 15 to be reflected until they can be detected by a light sensing device 14 such as a photo multiplier. In addition, the multifunctional coating 12 is capable of shifting shorter wavelength scintillation light 17 coming from the scintillator volume 13, re-emitting visible light 15 back into the volume of scintillator.

Figure 8:
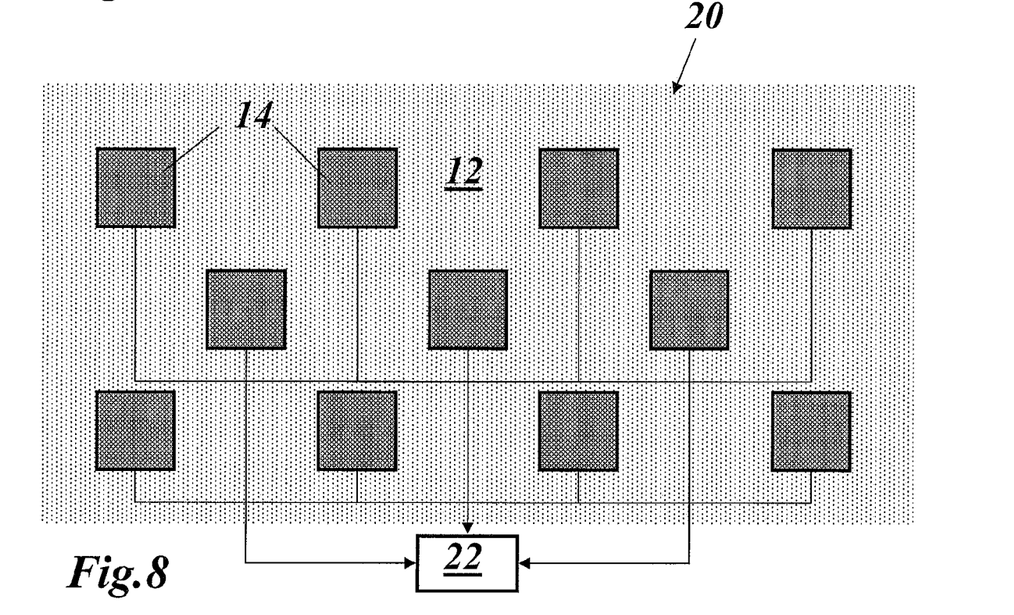
FIG. 8 shows a multifunctional coating with integrated distributed light sensors.

FIG. 8 shows an embodiment of the invention whereby the multifunctional coating 12 is interspersed with a plurality of solid state light detectors 14 such as pixelated Geiger mode avalanche photomultipliers, thereby reducing the number of reflections between light creation and detection.

The solid state light detectors 14 are connected to a common signal processing unit 22. Not only does this maximize light collection but also offers means to localize the point of origin of the light by a centre of gravity method. This interspersed multifunctional coating can form the inner lining of a detector filled with a noble gas scintillator, making a very robust detector consisting only of noble gas, wall, and circuitry without containing any fragile components. Such a detector can be capable of detecting and discerning gamma radiation, fast neutrons, and thermal neutrons.

Figure 9:
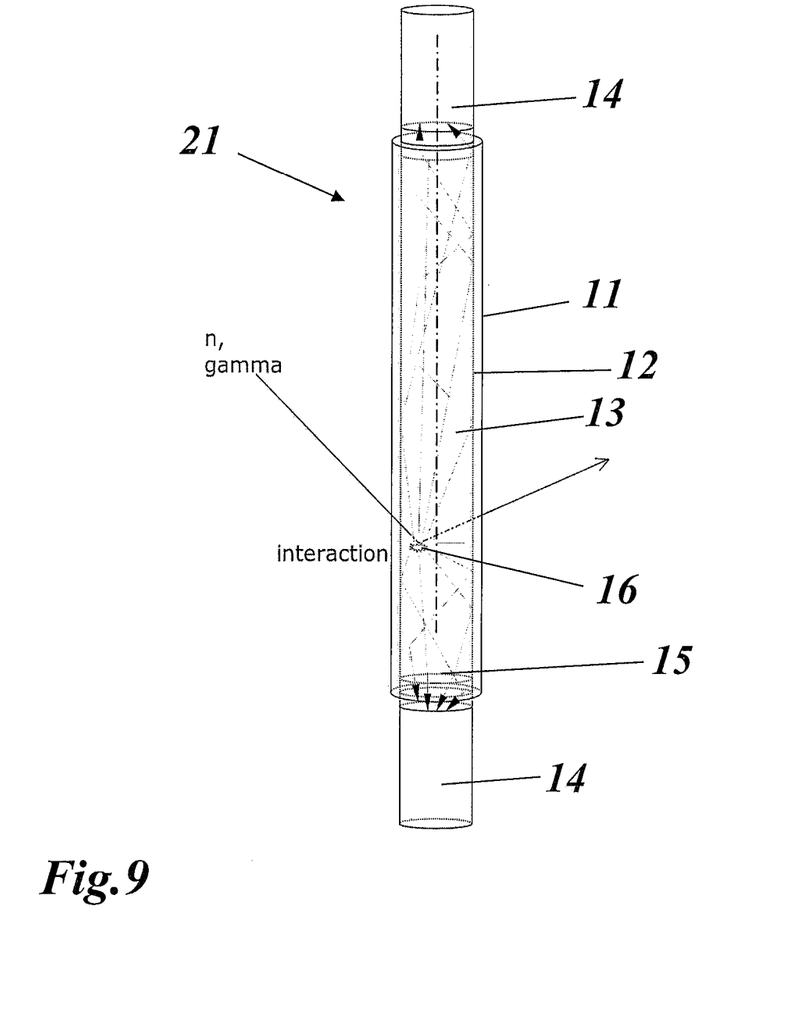
FIG. 9 shows a single detector for thermal neutrons, fast neutrons, and gamma rays.

According to FIG. 9 a detector 21 consisting of a scintillator volume 13, in this case noble gas, surrounded by the multifunctional coating 12, coated onto the walls 11 of the detector. In another embodiment, a flexible substrate is coated and inserted along the walls 11. Radiation interaction within the scintillator in a scintillation event 16 produces VUV scintillation light. When said VUV light first reaches the multifunctional coating 12, it is shifted to visible light. This visible light 15 is then reflected by the multifunctional coating until it reaches the sensitive area of a light sensing device 14 such as a PMT.

Figure 10:
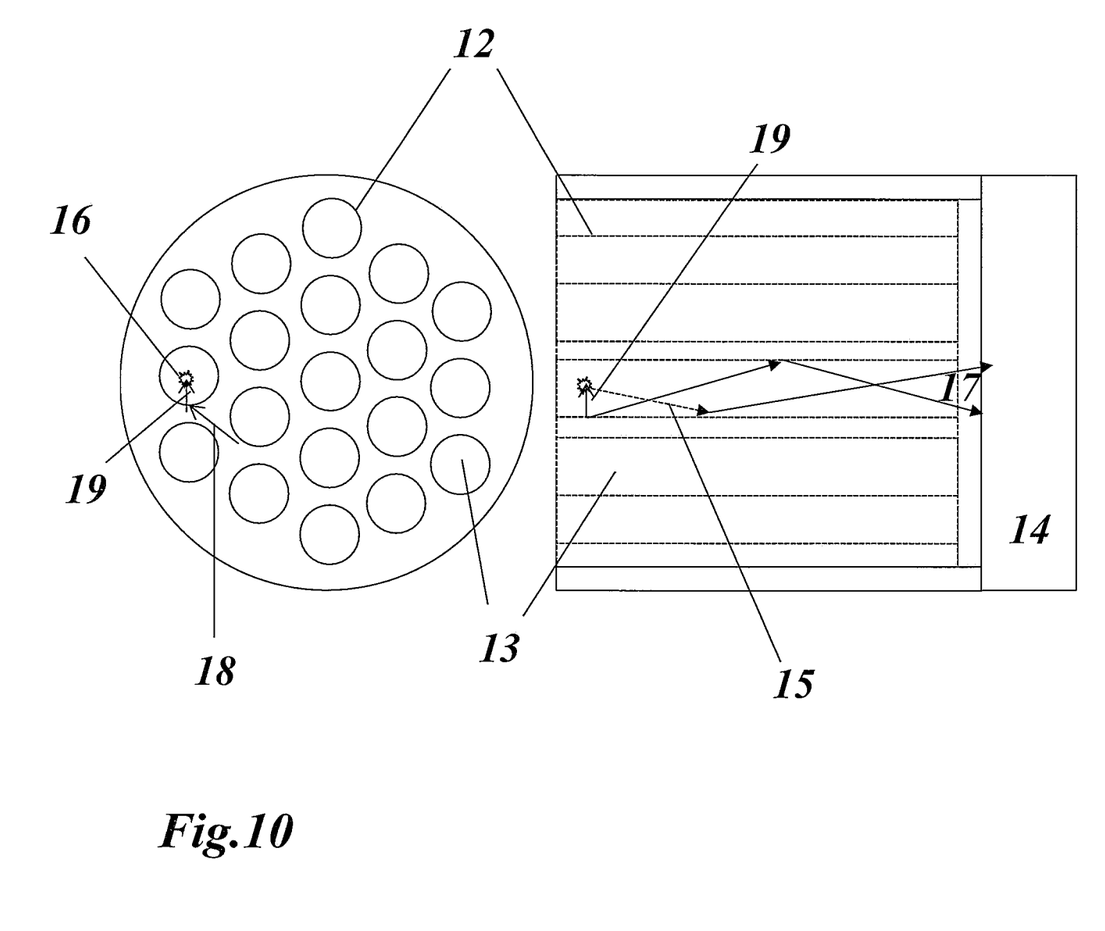
FIG. 10 shows an alternative geometry for the detector according to FIG. 9.

FIG. 10 shows a different arrangement of such a detector. The multifunctional coating has a geometry that increases its area and therefore the detector's sensitivity to thermal and epithermal neutrons relative to the detector's volume. In the example shown, the detector contains of a plurality of cylindrical sub-volumes 13', each lined by the multifunctional coating 12 coated directly onto a structure of PTFE. The cylindrical sub-volumes 13' contain helium gas acting as a scintillator. This structure may also act as a moderator for neutrons. Thermal neutrons 18 are converted by the multifunctional coating, emitting visible light 17. Conversion products also escape into the scintillating gas causing scintillation 16, as would also be caused by interaction of a fast neutron in the scintillating gas. The diameter of the individual cylinders is chosen to be big enough (a few millimetres in the case of 180 bar helium) such as to allow conversion products emitted from the multifunctional coating to lose all of their energy in the gas causing scintillation prior to hitting the opposite wall. The scintillation light 17, is shifted to visible light 15. Visible light 15 is reflected on the multifunctional coating until said light is detected by a light sensing device 14 such as an immersed solid state light sensor.

The present invention thus has a certain similarity to WO 2012/007734 A2, in that the coating produces light upon neutron capture, and that this signal is characteristic enough to be discriminated from other signals detected by the photoelectric converter (in WO 2012/007734 A2 from gamma events; in the present invention from gamma and fast neutron events) by pulse shape. The key differences of the present invention to WO 2012/007734 A2 are: In WO 2012/007734 A2, the converter layer serves a single purpose, which is to convert thermal neutrons to light. In the present invention, the layer serves a multiple purpose of: a) Converting thermal neutrons to light as in WO 2012/007734 A2, b) being reflective to visible light impinging on the layer, such that this light can be transported to a photomultiplier or similar device by simple reflection on the multifunctional coating and does not require a light guide's total internal reflection facilitated by an internal wavelength shifter. Further, in a preferred embodiment, c) the multifunctional coating contains a wavelength shifter to shift VUV scintillation light, impinging on the multifunctional coating, to wavelengths in the visible spectrum, the multifunctional coating then being reflective to the visible light.

In another preferred embodiment d), the multifunctional coating converts thermal or epi-thermal neutrons to light but also emits one or more particles in addition to the light produced.

Key difference between the aforementioned CA 2 312 593 A1 and the present invention is that the conversion layer in CA 2 312 593 A1 needs not be in optical contact with the scintillator, and performs no optical function. In the present invention, the conversion layer is in optical contact with the scintillator, and performs the function of a) reflecting light coming from the scintillator back into the scintillator, and b) upon neutron capture, emitting light (rather than a gamma ray) into the scintillator.

To those skilled in the art it seems that in CA 2 312 593 A1 the distinction of gamma events in the scintillator from neutron capture events occurs via the characteristic energy of the gamma emitted by the converter. This motivates the use of the described external gamma shield, to reduce unwanted gamma events in this energy range. In the present invention, neutron capture events are distinguished from other events via the characteristic signal shape.

Unlike the present invention, where the conversion layer emits an optical signal, US 2005/0258373 A1 exploits a charge collection approach.

Finally, the present invention allows the detector of WO 2007121876 A2 to be used as a triple detector being able to measure and distinguish gamma rays, thermal neutrons, and fast neutrons (the thermal neutron capability being novel).

LIST OF REFERENCE NUMERALS

10,20 detector arrangement
11 wall
12 multifunctional coating
12a neutron conversion layer
12b wavelength shifting layer
13 scintillator volume
14 light sensing device (e.g. photomultiplier or solid state light detector)
15 (visible) light
16 scintillating event
17 (scintillation) light
18 thermal neutron
19 conversion products
21 detector
22 signal processing unit

What is claimed is:

1. A detector arrangement (10, 20) for the detection of ionizing radiation comprising: at least one light sensing device (14) and a multifunctional coating (12) comprising a first layer (12a) and a second layer (12b), the coating (12) at least partially enclosing a scintillator volume (13) and arranged in an interacting relation to said at least one light sensing device (14), wherein:
   a) said second layer (12b) of the multifunctional coating (12) is capable of shifting short wavelength light (17) impinging upon it, reemitting with a wavelenght to which it is reflective, and said second layer (12b) is configured to reflect light of a given wavelength such that light or light signals (15) are transported by means of diffuse reflection, wherein said second layer (12b) of the multifunctional coating (12) repeatedly reflects light of a given wavelength coming from the scintillator volume (13), back through said scintillator volume (13), until reaching said light sensing device (14); and
   b) said first layer (12a) of the multifunctional coating (12) is configured to convert at least part of thermal and/or epi-thermal neutrons entering said multifunctional coating (12) into light (15).

2. The detector arrangement according to claim 1, wherein said multifunctional coating (12) is capable of emitting neutron conversion products in accompaniment of the light (15).

3. The detector arrangement according to claim 1, wherein a thickness of said first layer (12a) is between 1 µm and 40 µm and said second layer (12b) has a thickness between 0.1 µm and 1 µm.

4. The detector arrangement according to claim 1, wherein said first and second layers (12a, b) are applied to a flexible substrate, the flexible substrate comprising flash-spun high density polyethylene fibers or a PTFE membrane.

5. The detector arrangement according to claim 1, wherein a volume between said second layer (12b) of the multifunctional coating (12) and the light sensing device (14) includes a vacuum.

6. The detector arrangement according to claim 1, wherein the scintillator volume (13) is in optical contact with said second layer (12b) of the multifunctional coating (12), such that said light (15) from neutron conversion in said multifunctional coating (12) is emitted into the scintillator volume (13), whereby the light is detected by said light sensing device (14).

7. The detector arrangement according to claim 6, wherein said light sensing device (14) is one of a photomultiplier or pixelated Geiger mode avalanche photodiode.

8. The detector arrangement according to claim 6, wherein said scintillator volume (13) consists essentially of a noble gas selected from the group consisting of helium, argon and xenon or a mixture of helium doped with xenon.

9. The detector arrangement according to claim 8, wherein said scintillator volume (13) consists essentially of helium, thereby allowing the simultaneous measurement and distinction of fast neutrons, thermal neutrons, and/or photons and electrons produced by the interaction of photons with a detector wall (11).

10. The detector arrangement according to claim 8, wherein said scintillator volume (13) consists essentially of xenon, thereby allowing gamma spectrometry to be performed while also measuring neutrons.

11. The detector arrangement according to claim 8, wherein solid state light sensors comprising pixelated Geiger mode avalanche photodiodes are immersed in the scintillating gas.

12. The detector arrangement according to claim 8, wherein a plurality of light sensing devices (14) is interspersed in the area of said multifunctional coating (12).

13. The detector arrangement according to claim 6, wherein said scintillator volume (13) consists essentially of PVT or a liquid scintillator, thereby allowing the simultaneous measurement of gammas and neutrons.

14. A method for operating a detector arrangement according to claim 6, wherein signals from said neutron conversion are discerned from signals from said scintillator volume (13) by pulse shape discrimination, whereby the signals involving light emitted by said multifunctional coating (12) typically have a different time structure than the signals from said scintillator volume (13).

15. The method according to claim 14, wherein the light signals from said neutron conversion combined with the light signals from particle emission from the multifunctional coating (12) into said scintillator volume (13) are discerned from signals from said scintillator volume (13) alone by pulse shape discrimination, whereby the signals from neutron conversion typically have a different time structure than the signals from said scintillator volume (13).

16. The detector arrangement according to claim 1, wherein the scintillator volume (13) is in optical contact with said second layer (12b) of the multifunctional coating (12), such that said multifunctional coating (12) emits light (15) as well as one or more conversion products into the said scintillator volume (13), the conversion products causing scintillation inside the scintillator volume (13), when falling back upon the multifunctional coating (12) said scintillation light can be shifted and re-emitted back through said scintillator volume (13), and the light from the multifunctional coating (12) and the scintillator volume (13) is detected by said light sensing device (14), directly or after having been shifted in wavelength.

17. The detector arrangement according to claim 16, wherein said light sensing device (14) is one of a photomultiplier or pixelated Geiger mode avalanche photodiode.

18. The detector arrangement according to claim 16, wherein an in-situ gas purification device comprising a getter is immersed in the gas of said scintillator volume (13), thereby assuring a stable gas composition.

19. A detector arrangement (10, 20) for the detection of ionizing radiation comprising: at least one light sensing device (14) and a multifunctional coating (12) comprising a first layer (12a) and a second layer (12b), the multifunctional coating (12) at least partially enclosing a scintillator volume (13) and arranged in an interacting relation to said at least one light sensing device (14), wherein:
a) said second layer (12b) of said multifunctional coating (12) reflects light of a given wavelength such that light or light signals (15) are transported by means of diffuse reflection, wherein said second layer (12b) of the multifunctional coating (12) repeatedly reflects light of a given wavelength coming from the scintillator volume (13), back through said scintillator volume (13), until reaching said light sensing device (14);
b) said first layer (12a) of the multifunctional coating (12) converts at least part of thermal and/or epi-thermal neutrons entering said multifunctional coating (12) into light(15);
c) said second layer (12b) of the multifunctional coating (12) is capable of shifting short wavelength light (17) impinging upon it, reemitting light with a wavelength to which it is reflective; and
d) light or light signals (15) pass through the scintillator volume (13) without wavelength shifting.

20. A detector arrangement (10, 20) for the detection of ionizing radiation comprising:
at least one light sensing device (14); and
a multifunctional coating (12) at least partially enclosing a scintillator volume (13) and arranged in an interacting relation to said at least one light sensing device (14), said multifunctional coating (12) comprising a first layer (12a) of a neutron conversion material overcoated with a second layer (12b) of a wavelength shifting material, wherein:
a) said second layer (12b) of the multifunctional coating (12) is configured to reflect light of a given wavelength such that light or light signals (15) are transported to said light sensing device (14), wherein said multifunctional coating (12) repeatedly reflects light of a given wavelength coming from the scintillator volume (13), back through said scintillator volume (13), until reaching said light sensing device (14); and
b) said first layer (12a) of the multifunctional coating (12) is configured to convert at least part of thermal and/or epi-thermal neutrons entering said multifunctional coating (12) into light (15).

21. The detector arrangement of claim 20, wherein said first layer (12*a*) contains Li-6 or B-10, and said second layer (12*b*) contains Tetra Phenyl Butadiene (TPB).

22. The detector arrangement according to claim 20, wherein the scintillator volume (13) is in optical contact with said second layer (12*b*) of the multifunctional coating (12), such that said second layer (12*b*) of the multifunctional coating (12) reflects light of a given wavelength coming from the scintillator volume (13), back through said scintillator volume (13), shifts light of shorter wavelengths to be re-emitted back through said scintillator volume (13) at a wavelength at which said multifunctional coating (12) is reflective, and emits light from neutron conversion into the said scintillator volume (13), whereby the light is detected by said light sensing device (14).

23. The detector arrangement according to claim 22, wherein said light sensing device (14) is one of a photomultiplier or pixelated Geiger mode avalanche photodiode.

* * * * *

UNITED STATES PATENT AND TRADEMARK OFFICE
CERTIFICATE OF CORRECTION

PATENT NO. : 9,651,689 B2
APPLICATION NO. : 13/925018
DATED : May 16, 2017
INVENTOR(S) : Ulisse Gendotti et al.

It is certified that error appears in the above-identified patent and that said Letters Patent is hereby corrected as shown below:

Column 8, Line 57, Claim 1, delete "reemitting with a wavelenght" and insert -- reemitting light with a wavelength --

Column 9, Line 37, Claim 9, delete "thennal" and insert -- thermal --

Column 10, Line 27, Claim 19, delete "(12)at" and insert -- (12) at --

Column 10, Line 41, Claim 19, delete "light(15);" and insert -- light (15); --

Signed and Sealed this
Twelfth Day of December, 2017

Joseph Matal
*Performing the Functions and Duties of the
Under Secretary of Commerce for Intellectual Property and
Director of the United States Patent and Trademark Office*